(12) United States Patent
Ookawa

(10) Patent No.: US 6,504,155 B1
(45) Date of Patent: Jan. 7, 2003

(54) INFRARED CAMERA AND INFRARED CAMERA SYSTEM HAVING TEMPERATURE SELECTING SWITCH

(75) Inventor: Norio Ookawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/564,481

(22) Filed: May 4, 2000

(30) Foreign Application Priority Data

May 7, 1999 (JP) .......................... 11-126833
Dec. 14, 1999 (JP) .......................... 11-354455

(51) Int. Cl.[7] .............................. G01J 5/02; G01T 1/24; H04N 5/225; H04N 9/64
(52) U.S. Cl. ............. 250/352; 250/370.15; 348/207.99; 348/33
(58) Field of Search ............................ 250/252.1, 352, 250/370.15; 348/33, 207

(56) References Cited

U.S. PATENT DOCUMENTS

| | | | |
|---|---|---|---|
| 3,914,610 A | * 10/1975 | Bigbie | 250/338 |
| 4,587,563 A | * 5/1986 | Bendell et al. | 348/244 |
| 4,703,442 A | 10/1987 | Levine | |
| 5,296,705 A | 3/1994 | Pepin et al. | |
| 5,420,419 A | 5/1995 | Wood | |
| 5,450,727 A | 9/1995 | Ramirez et al. | |
| 5,650,622 A | 7/1997 | Ookawa et al. | |
| 5,914,488 A | 6/1999 | Sone | |
| 6,144,031 A | * 11/2000 | Herring et al. | 250/352 |

FOREIGN PATENT DOCUMENTS

| | | |
|---|---|---|
| EP | 0 747 683 A2 | 12/1996 |
| JP | 04-286479 | 10/1992 |
| JP | 09325073 | 12/1997 |
| JP | 10038684 | 2/1998 |
| JP | 10-111172 | 4/1998 |
| JP | 10122956 | 5/1998 |

* cited by examiner

Primary Examiner—Georgia Epps
Assistant Examiner—Alicia Harrington
(74) Attorney, Agent, or Firm—Burns, Doane, Swecker & Mathis, LLP

(57) ABSTRACT

An infrared camera with lower dissipation power, a wide range of operating environment temperature, and a shorter warmup is provided. The infrared camera includes a plurality of device operating-temperature setting circuits setting respective device operating temperatures different from one another, a device operating-temperature setting switch for selecting one of the output of the device operating-temperature setting circuits, and a temperature sensor, and performs imaging by switching the connection target of the device operating-temperature setting switch according to a measurement by the temperature sensor, that is to say, according to the temperature inside an enclosure and selecting an operating temperature for an imaging device among a plurality of device operating-temperature settings.

27 Claims, 10 Drawing Sheets

Fig. 10 *PRIOR ART*

INFRARED CAMERA AND INFRARED CAMERA SYSTEM HAVING TEMPERATURE SELECTING SWITCH

BACKGROUND OF THE INVENTION

1. Field of the Invention

This invention relates to an infrared camera and an infrared camera system equipped with the infrared camera and a display unit for displaying image signals obtained by the infrared camera.

2. Description of the Prior Art

Infrared cameras are used for, for example, fire detection, invasion monitoring, and installation monitoring. Furthermore, as shown in FIG. 7, an infrared camera C is mounted on a moving object M, such as a vehicle, and is used for detecting an obstacle by obtaining and displaying images representing the front of the moving object M. In addition, an infrared camera C is mounted on the rear or side of a moving object and is used for, for example, detecting a following moving object or a side moving object or obstacle. Moreover, as shown in FIG. 8, a removable head-mounted helmet H equipped with an infrared camera C and display unit D for displaying images obtained by the infrared camera C is mounted on the head of a person, such as a firefighter, and is used for, for example, to detect a heat source, such as a fire, by supplying power to the infrared camera C and display unit D using a battery B.

FIG. 9 is a block diagram of a conventional infrared camera. In this figure, M is a subject; 1 is an infrared optical system; 2 is an imaging device located on the image-formed plane of the infrared optical system 1; 3 is a device-temperature monitor thermally connected to the imaging device 2; 4 is a direct-current bias power supply connected to the imaging device 2; 5 is a device output-level setting circuit connected to the imaging device 2; 6 is a driver circuit connected to the imaging device 2; 7 is an amplifier connected to the imaging device 2; 8 is an offset-level setting circuit connected to the amplifier 7; 9 is a display processing circuit connected to the amplifier 7; 10 is a sensitivity-correcting data memory connected to the display processing circuit 9; 11 is a defect-correcting data memory connected to the display processing circuit 9; 12 is a thermoelectric device thermally connected to the imaging device 2; 13 is a device operating-temperature setting circuit; 14 is a power-supply circuit connected to the device-temperature monitor 3, the device operating-temperature setting circuit 13, and the thermoelectric device 12. The sensitivity-correcting data memory 10 and defect-correcting data memory 11 are ROMs which have recorded and stored correction data at the time of the test and adjustment of a camera. 15 is a shutter located across an optical path between the infrared optical system 1 and the imaging device 2; 16 is a timing-generating circuit connected to the driver circuit 6, the display processing circuit 9, and the shutter 15; 17 is a device package for housing the imaging device 2, the device-temperature monitor 3, and the thermoelectric device 12; 18 is an infrared window for transmitting infrared rays; 19 is an enclosure. The space sealed by the device package 17 and the infrared window 18 is held in a vacuum and a conventional technical example of such an implementation method can be found in Japanese Patent National Publication No. Hei 7-508384.

FIG. 10 shows the structure of the imaging device 2. For the sake of simplicity, it is assumed that the number of pixels for the imaging device 2 is 2×2. In this figure, 20–23 are infrared-detecting devices; 24–27 are diodes; 28–32 are transistors; 33 is a horizontal scanning circuit; 34 is a vertical scanning circuit. The infrared-detecting devices 20–23 are, for example, microbolometers having a hollow structure described in Japanese Patent National Publication No. Hei 7-509057.

FIG. 11 shows the structure of the display processing circuit 9. In this figure, 35 is an A/D converting circuit; 36 is an offset-correcting data memory; 37 is an offset-correcting circuit; 38 is a sensitivity-correcting circuit; 39 is a defect-correcting circuit; 40 is a D/A converting circuit.

Now, the operation will be described. When power is applied, the power-supply circuit 14 supplies the thermoelectric device 12 with power corresponding to the difference between the output of the device-temperature monitor 3 and that of the device operating-temperature setting circuit 13 and stabilizes the temperature of the imaging device 2 at a constant room temperature set by the device operating-temperature setting circuit 13. This temperature is usually between 20 and 40° C. Next, clock signals generated by the timing-generating circuit 16 are sent to the imaging device 2 via the driver circuit 6. The horizontal scanning circuit 33 and vertical scanning circuit 34 having received the clock signals supply bias currents depending on the output of the device output-level setting circuit 5 and on the characteristics of the transistor 32 from the direct-current bias power supply 4 to the infrared-detecting devices 20–23, in order, by turning on the transistors 28–31 in order. The presence of the diodes 24–27 causes a bias current to flow to ground via a selected infrared-detecting device and the transistor 32. Signals corresponding to the resistance value of each infrared-detecting device are output as a potential difference arising between the transistor 32 and the ground and are amplified by the amplifier 7 and are then input to the display processing circuit 9.

The shutter 15 is temporarily closed and the output of the infrared-detecting devices 20–23 exposed to uniform infrared rays, that is to say, voltage corresponding to dispersion specific to the resistance values of the infrared-detecting devices 20–23 is converted to digital signals by the A/D converting circuit 35 and stored into the offset-correcting data memory 36. Next, the shutter 15 is opened and infrared rays emitted from subject M are collected by the infrared optical system 1 and are transmitted through the infrared window 18 and then image-formed on the infrared-detecting devices 20–23. This causes minute temperature rises in the infrared-detecting devices 20–23 of about a few millikelvin corresponding to the intensity of infrared rays emitted from subject M and their resistance values change individually. Under this condition, offset correction is performed in the offset-correcting circuit 37 by subtracting offset-correcting data for each infrared-detecting device.

The sensitivity-correcting data memory 10 stores data regarding dispersion of the sensitivity to a target temperature difference of each infrared-detecting device. Sensitivity correction is performed in the sensitivity-correcting circuit 38 by multiplying stored data for each infrared-detecting device. In addition, the defect-correcting data memory 11 stores the addresses of pixels having a sensitivity outside a prescribed range, that is to say, of defective pixels. The correction of a defective pixel is performed by consecutively using the output for the next pixel on the left side of the defective pixel. After the above correction, signals are converted by the D/A converting circuit 40 to analog video signals, which are output.

A conventional infrared camera has the above structure. Therefore, when it is used at an environment temperature, for example at a temperature below −10° C. or above +60° C., which is widely different from the operating temperature of the imaging device 2, the amount of heat flowing in or out via thermal resistance between the imaging device 2 and the device package 17, or via the thermal resistance of the electric connections of the imaging device 2 and the device-temperature monitor 3 increases. This will increase the amount of heat emitted or absorbed by the thermoelectric device 12 for stabilizing the imaging device 2 at a constant temperature, resulting in the drawback of higher dissipation power. Moreover, if the difference between the operating temperature of the imaging device 2 and the environment temperature is great and the amount of heat flowing in or out exceeds the ability of the thermoelectric device 12 as a heat pump, there is the drawback that the imaging device 2 cannot be stabilized at a prescribed operating temperature. In addition, at an environment temperature widely different from the operating temperature of the imaging device 2, there exists the drawback that a longer time is necessary to heat the imaging device 2 from the temperature before a start to a target operating temperature at the time of warming up after power application, or to cool the imaging device 2.

The present invention was made in order to remove the above drawbacks and provides an infrared camera and an infrared camera system with lower dissipation power, even at a low or high temperature, a wide range of operating temperature, and a shorter warmup by stabilizing the imaging device 2 at a temperature selected among a plurality of device operating-temperature settings and operating the camera.

SUMMARY OF THE INVENTION

An infrared camera according to the present invention comprises an infrared optical system; an imaging device located on the image-formed plane of the infrared optical system; a thermoelectric device thermally connected to the imaging device; a device-temperature monitor thermally connected to the imaging device; a device package for housing the imaging device, the thermoelectric device, and the device-temperature monitor; a plurality of device operating-temperature setting means each having a different device operating-temperature setting; device operating-temperature switching means for switching the output of the plurality of device operating-temperature setting means; drive control means for drive-controlling the thermoelectric device based on the output switched by the device operating-temperature switching means and on the output of the device-temperature monitor; drive means for driving the imaging device; and amplifying means for amplifying the output of the imaging device.

Further, an infrared camera according to a preferred aspect of the present invention includes device output-level compensating means for carrying out adjustment so as to make the output level of the imaging device constant.

In an infrared camera according to a preferred aspect of the present invention, the device output-level compensating means comprises a plurality of direct-current bias power supplies each having a different bias voltage setting and direct-current bias power supply switching means for selecting one of the outputs of the plurality of direct-current bias power supplies and supplying the imaging device with the selected output.

Further, in an infrared camera according to a preferred aspect of the present invention, the device output-level compensating means comprises a plurality of device output-level setting means each having a different device output-level setting and device output-level switching means for selecting one of the outputs of the plurality of device output-level setting means and sending the selected output to the imaging device.

An infrared camera according to a preferred aspect of the present invention includes a plurality of offset-level setting means each having a different offset-level setting and offset-level switching means for selecting one of the outputs of the plurality of offset-level setting means and sending the selected output to the amplifying means.

Further, an infrared camera according to a preferred aspect of the present invention includes display processing means for processing the output of the amplifying means and outputting image signals, a plurality of memories storing a plurality of sensitivity-correcting data corresponding to a plurality of operating temperatures set by the plurality of device operating-temperature setting means, and sensitivity-correcting data switching means for selecting one of the plurality of memories and outputting the contents of the selected memory to the display processing means.

An infrared camera according to a preferred aspect of the present invention includes a plurality of memories storing a plurality of defect-correcting data corresponding to a plurality of operating temperatures set by the plurality of device operating-temperature setting means and defect-correcting data switching means for selecting one of the plurality of memories and outputting the contents of the selected memory to the display processing means.

Further, an infrared camera according to a preferred aspect of the present invention includes an external switch for outputting signals to switch both the connection targets of the device operating-temperature switching means and the direct-current bias power supply switching means.

An infrared camera according to a preferred aspect of the present invention includes an external switch for outputting signals to switch both the connection targets of the device operating-temperature switching means and the device output-level switching means.

Further, an infrared camera according to a preferred aspect of the present invention includes an external switch for outputting signals to switch both the connection targets of the device operating-temperature switching means and the offset-level switching means.

An infrared camera according to a preferred aspect of the present invention includes an external switch for outputting signals to switch both the connection targets of the device operating-temperature switching means and the sensitivity-correcting data switching means.

Further, an infrared camera according to a preferred aspect of the present invention includes an external switch for outputting signals to switch both the connection targets of the device operating-temperature switching means and the defect-correcting data switching means.

An infrared camera according to a preferred aspect of the present invention includes device operating-temperature auto-switching means comprising a temperature sensor, switching temperature setting means for setting a switching temperature, and comparing means for comparing a temperature measurement by the temperature sensor and a temperature set by the switching temperature setting means and outputting switching signals to direct-current bias power supply switching means based on the comparison result.

Further, an infrared camera according to a preferred aspect of the present invention includes device operating-temperature auto-switching means comprising a temperature sensor, switching temperature setting means for setting a switching temperature, and comparing means for comparing a temperature measurement by the temperature sensor and a temperature set by the switching temperature setting means and outputting switching signals to device output-level switching means based on the comparison result.

An infrared camera according to a preferred aspect of the present invention includes device operating-temperature auto-switching means comprising a temperature sensor, switching temperature setting means for setting a switching temperature, and comparing means for comparing a temperature measurement by the temperature sensor and a temperature set by the switching temperature setting means and outputting switching signals to offset-level switching means based on the comparison result.

Further, an infrared camera according to a preferred aspect of the present invention includes device operating-temperature auto-switching means comprising a temperature sensor, switching temperature setting means for setting a switching temperature, and comparing means for comparing a temperature measurement by he temperature sensor and a temperature set by the switching temperature setting means and outputting switching signals to sensitivity-correcting data switching means based on the comparison result.

An infrared camera according to a preferred aspect of the present invention includes device operating-temperature auto-switching means comprising a temperature sensor, switching temperature setting means for setting a switching temperature, and comparing means for comparing a temperature measurement by the temperature sensor and a temperature set by the switching temperature setting means and outputting switching signals to defect-correcting data switching means based on the comparison result.

Further, an infrared camera according to a preferred aspect of the present invention includes the temperature sensor inside an enclosure housing the device package, at least.

An infrared camera according to a preferred aspect of the present invention includes the temperature sensor outside an enclosure housing the device package, at least.

Further, an infrared camera system according to a preferred aspect of the present invention includes a moving object on which an infrared camera according to the present invention is mounted and display means for displaying images obtained by the infrared camera.

An infrared camera system according to a preferred aspect of the present invention includes an infrared camera according to the present invention, display means for displaying images obtained by the infrared camera, fixing means for removably fixing the infrared camera and the display means to a person, and a battery for supplying the infrared camera and the display means with power.

DESCRIPTION OF THE EMBODIMENTS

Embodiment 1

FIG. 1 is a block diagram showing Embodiment 1 of an infrared camera according to the present invention. In this figure, 1–3, 5–12, and 14–19 are the same as those in a conventional infrared camera. 41 is a device operating-temperature setting circuit; 42 is a device operating-temperature setting circuit for setting an operating temperature different from that set by the device operating-temperature setting circuit 41; 43 is a device operating-temperature change-over switch connected to the device operating-temperature setting circuits 41 and 42; 61 is a device output-level compensating circuit. The device output-level compensating circuit 61 includes a direct-current bias power supply 62, a direct-current bias power supply 63 for outputting a voltage different from that output by the direct-current bias power supply 62, and a direct-current bias power supply change-over switch 64 connected to the direct-current bias power supplies 62 and 63. 47 is an external switch fixed onto an enclosure 19 and connected to the device operating-temperature change-over switch 43 and the direct-current bias power supply change-over switch 64.

Now, the operation of an infrared camera according to the present invention will be described. Either of the device operating-temperature setting circuits 41 and 42 is selected by the external switch 47 as the connection target of the device operating-temperature change-over switch 43 before power is applied. Specifically, set temperatures by the device operating-temperature setting circuits 41 and 42 are 20° C. and 40° C. respectively. It is considered that the temperature will rise by about 10° C. before the inside of the enclosure 19 can reach a thermal equilibrium state after power application. Therefore, if the environment temperature, that is to say, the ambient temperature for the enclosure 19 (device package 17), is below 20° C., 20° C. is selected; if it is over 20° C., 40° C. is selected.

Next, power is applied and imaging is performed the same as with a conventional device. The resistance values of infrared-detecting devices 20–23 with a selected operating temperature of the imaging device 2 of 20° C. are significantly different from those with a selected operating temperature of the imaging device 2 of 40° C. and the output level of the imaging device 2 changes, leading to the saturation of the amplifier 7 and the display processing circuit 9. Normal images therefore cannot be output. In order to solve this problem, voltage supplied to the imaging device 2 is switched by switching the direct-current bias power supply change-over switch 64, together with the device operating-temperature change-over switch 43, and the amount of bias currents passed through the infrared-detecting devices 20–23 is switched. This adjusts the output level of the imaging device 2 so that it becomes constant.

A combination of the device operating-temperature setting circuit 41 and the direct-current bias power supply 62 or a combination of the device operating-temperature setting circuit 42 and the direct-current bias power supply 63 is selected. If the environment temperature goes up over or down below 20° C. during the imaging, and changing the operating temperature of the imaging device 2 from 20° C. to 40° C. or from 40° C. to 20° C. is considered to reduce dissipation power, the connection targets of the device operating-temperature setting switch 43 and the direct-current bias power supply change-over switch 64 are changed together by switching the external switch 47. The shutter 15 is then closed again, offset-correcting data 36 is newly obtained, and imaging is continued the same as with a conventional device.

Given a structure of the imaging device 2 shown in FIG. 10, voltage output from the direct-current bias power supply 62 is higher than that output from the direct-current bias power supply 63 if the set temperatures of the device operating-temperature setting circuits 41 and 42 are 20° C. and 40° C. respectively.

Embodiment 2

FIG. 2 is a block diagram showing Embodiment 2 of an infrared camera according to the present invention. In this Figure, 1–4, 6–12, and 14–19 are the same as those in a conventional infrared camera. 41, 42, 43, and 47 are the same as those in Embodiment 1. 61 is a device output-level compensating circuit, which includes a device output-level setting circuit 44, a device output-level setting circuit 45 for setting a value different from that set by the device output-level setting circuit 44, and a device output-level change-over switch 46 connected to the device output-level setting circuits 44 and 45.

Now, the operation of an infrared camera according to the present invention will be described. Before power application, the connection target of the device operating-temperature change-over switch 43 is selected, as with Embodiment 1, by the external switch 47 according to the environment temperature, that is to say, according to the ambient temperature for the enclosure 19. Imaging is then performed. As with Embodiment 1, the resistance values of infrared-detecting devices 20–23 with a selected operating temperature of the imaging device 2 of 20° C. are significantly different from those with a selected operating temperature of the imaging device 2 of 40° C. and the output level of the imaging device 2 changes, leading to the saturation of the amplifier 7 and the display processing circuit 9. Normal images therefore cannot be output. In order to solve this problem, voltage supplied to a transistor 32 in the imaging device 2 is switched by switching the device output-level change-over switch 46, together with the device operating-temperature change-over switch 43, and the amount of bias currents passed through the infrared-detecting devices 20–23 is switched. This adjusts the output level of the imaging device 2 so that it becomes constant.

A combination of the device operating-temperature setting circuit 41 and the device output-level setting circuit 44 or a combination of the device operating-temperature setting circuit 42 and the device output-level setting circuit 45 is selected. If the environment temperature goes up over or down below 20° C. during the imaging, and changing the operating temperature of the imaging device 2 from 20° C. to 40° C. or from 40° C. to 20° C. is considered to reduce dissipation power, the connection targets of the device operating-temperature setting switch 43 and the device output-level setting switch 46 are changed together by switching the external switch 47. The shutter 15 is then closed again, offset-correcting data 36 is newly obtained, and imaging is continued the same as with a conventional device.

Given a structure of the imaging device 2 shown in FIG. 10, voltage output from the device output-level setting circuit 44 is lower than that output from the device output-level setting circuit 45 if the set temperatures of the device operating-temperature setting circuits 41 and 42 are 20° C. and 40° C. respectively.

Embodiment 3

FIG. 3 is a block diagram showing Embodiment 3 of an infrared camera according to the present invention. In this figure, 1–7, 9–12, and 14–19 are the same as those in a conventional infrared camera. 41–43 and 47 are the same as those in Embodiment 1. 48 is an offset-level setting circuit; 49 is an offset-level setting circuit for outputting a value different from that output by the offset-level setting circuit 48; 50 is an offset-level change-over switch connected to the offset-level setting circuits 48 and 49.

Now, the operation of an infrared camera according to the resent invention will be described. Before power application, he connection target of the device operating-temperature change-over switch 43 is selected, as with Embodiment 1, by the external switch 47 according to the environment temperature, that is to say, according to the ambient temperature for the enclosure 19. Imaging is then performed. The resistance values of infrared-detecting devices 20–23 with a selected operating temperature of the imaging device 2 of 20° C. are significantly different from those with a selected operating temperature of the imaging device 2 of 40° C. and the output level of the entire imaging device 2 changes, leading to the saturation of the amplifier 7 and the display processing circuit 9. Normal images therefore cannot be output. In order to solve this problem, an offset level supplied to the amplifier 7 is switched by switching the offset-level change-over switch 50, together with the device operating-temperaturechange-over switch 43, and the output level of the amplifier 7 is adjusted so that it becomes constant.

A combination of the device operating-temperature setting circuit 41 and the offset-level setting circuit 48 or a combination of the device operating-temperature setting circuit 42 and the offset-level setting circuit 49 is selected. If the environment temperature goes up over or down below 20° C. during the imaging, and changing the operating temperature of the imaging device 2 from 20° C. to 40° C. or from 40° C. to 20° C. is considered to reduce dissipation power, the connection targets of the device operating-temperature setting switch 43 and the device output-level setting switch 46 are changed together by switching the external switch 47. The shutter 15 is then closed again, offset-correcting data 36 is newly obtained, and imaging is continued the same as with a conventional device.

Given a structure of the imaging device 2 shown in FIG. 10, voltage output from the offset-level setting circuit 48 is lower than that output from the offset-level setting circuit 49 if the set temperatures of the device operating-temperature setting circuits 41 and 42 are 20° C. and 40° C. respectively.

Embodiment 4

FIG. 4 is a block diagram showing Embodiment 4 of an infrared camera according to the present invention. In this figure, 1–4, 6–9, 12, 14, and 15–19 are the same as those in a conventional infrared camera. 41–43 and 47 are the same as those in Embodiment 1; 44–46 and 61 are the same as those in Embodiment 2. 51 is a sensitivity-correcting data memory storing sensitivity-correcting data corresponding to a device operating temperature set by the device operating-temperature setting circuit 41; 52 is a sensitivity-correcting data memory storing sensitivity-correcting data corresponding to a device operating temperature set by the device operating-temperature setting circuit 42; 53 is a sensitivity-correcting data change-over switch connected to the sensitivity-correcting data memories 51 and 52; 54 is a defect-correcting data memory storing defect-correcting data corresponding to a device operating temperature set by the device operating-temperature setting circuit 41; 55 is a defect-correcting data memory storing defect-correcting data corresponding to the device operating temperature set by the device operating-temperature setting circuit 42; 56 is a defect-correcting data change-over switch connected to the defect-correcting data memories 54 and 55. The sensitivity-correcting data memories 51 and 52 and the defect-correcting data memories 54 and 55 are ROMs which have recorded and stored correction data at the time of the test and adjustment of a camera.

Now, the operation of an infrared camera according to the present invention will be described. Before power application, the connection target of the device operating-temperature change-over switch 43 is selected by the external switch 47, as with Embodiment 1. Imaging is then performed. The distribution of dispersion values of the sensitivity of infrared-detecting devices 20–23 with a selected operating temperature of the imaging device 2 of 20° C. is different from that with a selected operating temperature of the imaging device 2 of 40° C. Therefore, proper sensitivity-correcting data corresponding to the operating temperature of the imaging device 2 is supplied to the display processing circuit 9 by switching the sensitivity-correcting data change-over switch 53, together with the device operating-temperature change-over switch 43, and the occurrence of noise of a fixed pattern resulting from a shift in sensitivity correction caused by a change in the operating temperature of the imaging device 2 is prevented. A combination of the device operating-temperature setting circuit 41 and the sensitivity-correcting data memory 51 or a combination of the device operating-temperature setting circuit 42 and the sensitivity-correcting data memory 52 is selected. Similarly, the distribution of defective pixels of the infrared-detecting devices 20–23 with an operating temperature of the imaging device 2 of 20° C. is also different from that with an operating temperature of the imaging device 2 of 40° C. Therefore, proper defect-correcting data corresponding to the operating temperature of the imaging device 2 is supplied to the display processing circuit 9 by switching the defect-correcting data change-over switch 56, together with the device operating-temperature change-over switch 43, and the occurrence of noise of a fixed pattern resulting from a shift in defect correction caused by a change in the operating temperature of the imaging device 2 is prevented.

A combination of the device operating-temperature setting circuit 41 and the defect-correcting data memory 54 or a combination of the device operating-temperature setting circuit 42 and the defect-correcting data memory 55 is selected. If the environment temperature goes up over or down below 20° C. during the imaging, and changing the operating temperature of the imaging device 2 from 20° C. to 40° C. or from 40° C. to 20° C. is considered to reduce dissipation power, the connection targets of the device operating-temperature setting switch 43, the device output-level setting switch 46, the sensitivity-correcting data change-over switch 53, and the defect-correcting data change-over switch 56 are changed together by switching the external switch 47. The shutter 15 is then closed again, offset-correcting data is newly obtained into an offset-correcting data memory 36, and imaging is continued the same as a conventional device.

Embodiment 5

FIG. 5 is a block diagram showing Embodiment 5 of an infrared camera according to the present invention. In this figure, 1–4, 6–9, 12, 14, and 15–19 are the same as those in a conventional infrared camera. 41–43 are the same as those in Embodiment 1; 44–46 and 61 are the same as those in Embodiment 2; 51–56 are the same as those in Embodiment 4; 60 is a device operating-temperature auto-switching circuit. The device operating-temperature auto-switching circuit 60 comprises a comparing circuit 57 connected to the device operating-temperature change-over switch 43, the device output-level change-over switch 46, the sensitivity-correcting data change-over switch 53, and the defect-correcting data change-over switch 56, a temperature sensor 58 connected to the comparing circuit 57, and a switching temperature setting circuit 59 connected to the comparing circuit 57. The temperature sensor 58 is located inside the enclosure 19 for housing the device package 17, the infrared window 18 attached to the device package 17 and other components.

Now, the operation of an infrared camera according to the present invention will be described. The temperature inside the enclosure 19 is measured by the temperature sensor 58 immediately after power application. This value and a switching temperature output from the switching temperature setting circuit 59 are compared in the comparing circuit 57 and the connection targets of the device operating-temperature change-over switch 43, the device output-level change-over switch 46, the sensitivity-correcting data change-over switch 53, and the defect-correcting data change-over switch 56 are selected. Specifically, the temperature will rise by about 10° C. before the inside of the enclosure 19 can reach a thermal equilibrium state after power application, so set temperatures by the device operating-temperature setting circuits 41 and 42 are 20° C. and 40° C. respectively and a switching temperature set by the switching temperature setting circuit 59 is 20° C. If the temperature inside the enclosure 19 is below 20° C., an operating temperature of the imaging device of 20° C. is selected; if the temperature inside the enclosure 19 is over 20° C., an operating temperature of the imaging device of 40° C. is selected.

Next, the temperature of the imaging device 2 is stabilized at that set by the device operating-temperature setting circuit 41 or 42 and then imaging is started, as with Embodiment 4. If the temperature inside the enclosure 19 changes during the imaging due to a change in the ambient temperature for the enclosure 19 or the influence of self-generating heat and passes through a set value for the switching temperature (goes up over or down under a set value for the switching temperature), the comparing circuit 57 changes the connection targets of the device operating-temperature change-over switch 43, the device output-level setting switch 46, the sensitivity-correcting data change-over switch 53, and the defect-correcting data change-over switch 56 together. The shutter 15 is then closed again, offset-correcting data 36 is newly obtained, and imaging is continued the same as with a conventional device.

Automatically changing the operating temperature of the imaging device 2 can stop imaging for, for example, a few seconds. If the above operation is operationally inconvenient, the imaging can be performed without a stop by maintaining the connection combination obtained by the above auto-switching at the time of warming up of the infrared camera.

Embodiment 6

FIG. 6 is a block diagram showing Embodiment 6 of an infrared camera according to the present invention. In this figure, 1–4, 6–9, 12, 14, and 15–19 are the same as those in a conventional infrared camera. 41–43 are the same as those in Embodiment 1; 44–46 and 61 are the same as those in Embodiment 2; 51–56 are the same as those in Embodiment 4; 57–60 are the same as those in Embodiment 5. The temperature sensor 58 is located outside the enclosure 19 and is thermally insulated from the enclosure 19.

Now, the operation of an infrared camera according to the present invention will be described. The temperature outside the enclosure 19 is measured by the temperature sensor 58 immediately after power application. This value and a switching temperature output from the switching temperature setting circuit 59 are compared in the comparing circuit 57 and the connection targets of the device operating-temperature change-over switch 43, the device output-level change-over switch 46, the sensitivity-correcting data change-over switch 53, and the defect-correcting data change-over switch 56 are selected. Imaging is then performed the same as with Embodiment 5. If the temperature around the enclosure 19 changes during the imaging and passes through a set value for the switching temperature, the comparing circuit 57 changes the connection targets of the device operating-temperature setting switch 43, the device output-level setting switch 46, the sensitivity-correcting data change-over switch 53, and the defect-correcting data change-over switch 56 together. The shutter 15 is then closed again, offset-correcting data 36 is newly obtained, and imaging is continued the same as with Embodiment 5.

There are cases in which a reduction of the amount of dissipation power is highly required. For example, if an infrared camera according to the present invention is driven with a battery, power is kept off for the purpose of avoiding the dissipation of a battery during a time when imaging is not necessary after completion of a series of imaging, and then power may be applied again before the temperature inside the enclosure 19 becomes equal to that around the enclosure 19. If the temperature sensor 58 is located inside the enclosure 19, as with Embodiment 5, and imaging is started at an ambient temperature of, for example, 15° C. with the operating temperature of the imaging device 2 set to 20° C., the temperature inside the enclosure 19 will reach about 25° C. at the time of thermal equilibrium being reached. If power is turned off temporarily at this point and is applied again before the temperature inside the enclosure 19 goes down below 20° C. (without enough cooling time), the ambient temperature is still 15° C., but the operating temperature of the imaging device 2 reaches 40° C. This makes it impossible to reduce dissipation power. In an infrared camera according to the present invention, the temperature sensor 58 is located outside the enclosure 19, so the operating temperature of the imaging device 2 is 20° C. even in the above case. This means that imaging is performed by setting the operating temperature to a value which always enables lower dissipation power.

Embodiment 7

By applying an infrared camera in the above Embodiments 1–6 to an infrared camera system shown in FIG. 7, that is to say, by mounting an infrared camera in the above Embodiments 1–6 on moving object M, images of high quality can be obtained and obstacles and following moving objects can be detected effectively.

In addition, if power for an infrared camera in Embodiments 1–6 is supplied especially from a battery in a moving object (vehicle, for example) on which the infrared camera is mounted, dissipation power of the battery in the moving object can be reduced because an infrared camera according to the present invention enables a reduction in dissipation power.

Embodiment 8

By applying an infrared camera in the above Embodiments 1–6 to an infrared camera system shown in FIG. 8, that is to say, by mounting a removable head-mounted helmet H equipped with infrared camera C according to the present invention and display unit D for displaying images obtained by infrared camera C on the head of a person, such as a firefighter, and supplying power to infrared camera C and display unit D by battery B, various activities, including detecting a heat source (fire, for example), can be performed. Moreover, an infrared camera according to the present invention enables a reduction in dissipation power, so dissipation power of a battery can be reduced. This enables fire detecting, searching, firefighting, etc. continued for longer than before.

ADVANTAGEOUS EFFECT OF THE INVENTION

According to the present invention, an infrared camera with lower dissipation power, a wide range of operating temperature, and a shorter warmup is obtained because the amount of heat flowing into or out of an imaging device decreases even at a low or high temperature.

Moreover, according to the present invention, an infrared camera with lower dissipation power even at a low or high temperature, a wide range of operating environment temperature, a shorter warmup, and images of high quality is obtained.

According to the present invention, an infrared camera with lower dissipation power even at a low or high temperature, a wide range of operating environment temperature, a shorter warmup, and ease of handling is obtained.

Moreover, according to the present invention, an infrared camera with lower dissipation power even at a low or high temperature, a wide range of operating environment temperature, a shorter warmup, and the ability to maintain low dissipation power in the case of power being frequently turned on and off is obtained.

According to the present invention, images of high quality are obtained and there exists a special effect in the case of a battery being used as power supply.

Figure 1:
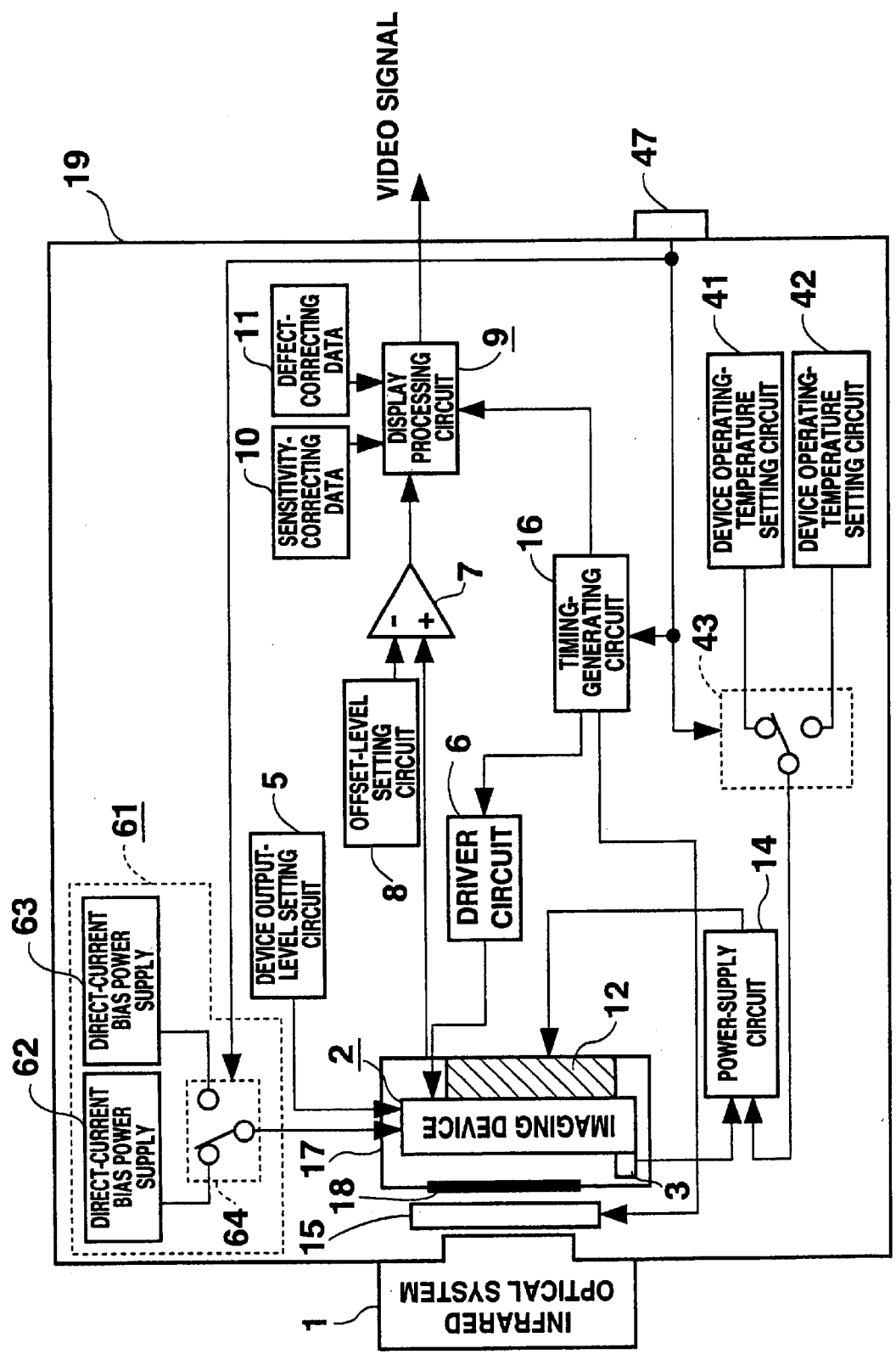
FIG. 1 is a block diagram showing the structure of Embodiment 1 of an infrared camera according to the present invention.
Figure 2:
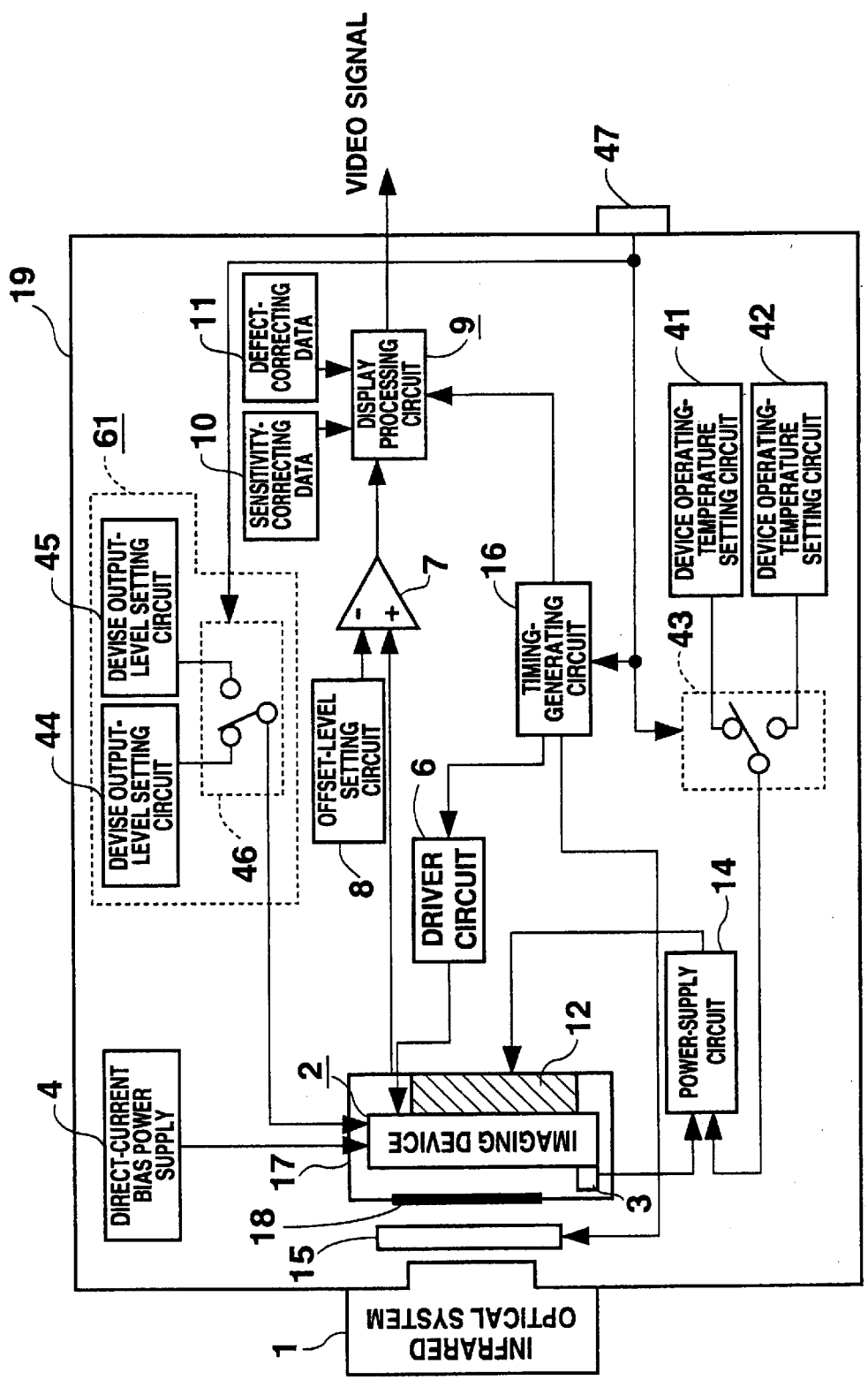
FIG. 2 is a block diagram showing the structure of Embodiment 2 of an infrared camera according to the present invention.
Figure 3:
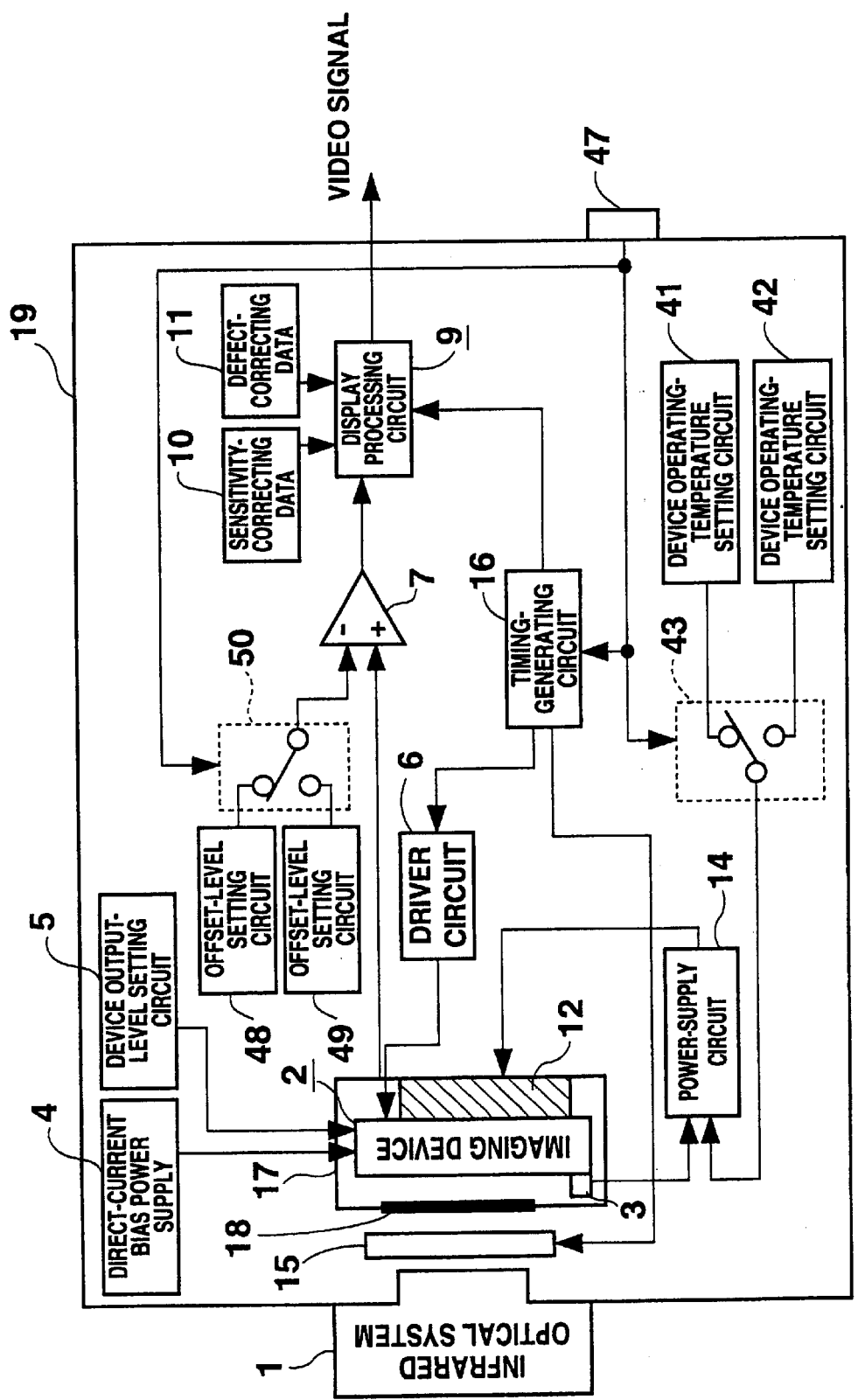
FIG. 3 is a block diagram showing the structure of Embodiment 3 of an infrared camera according to the present invention.
Figure 4:
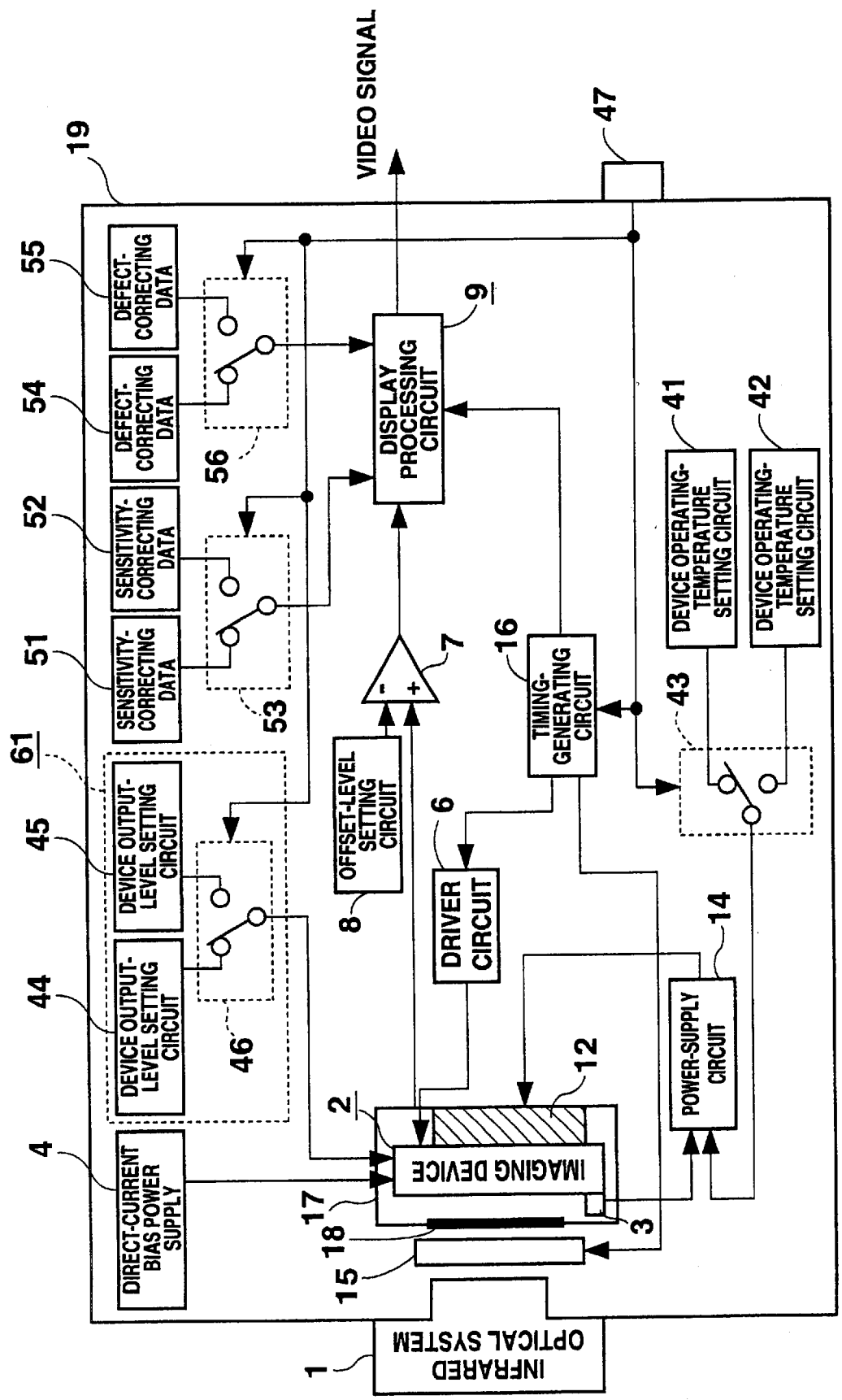
FIG. 4 is a block diagram showing the structure of Embodiment 4 of an infrared camera according to the present invention.
Figure 5:
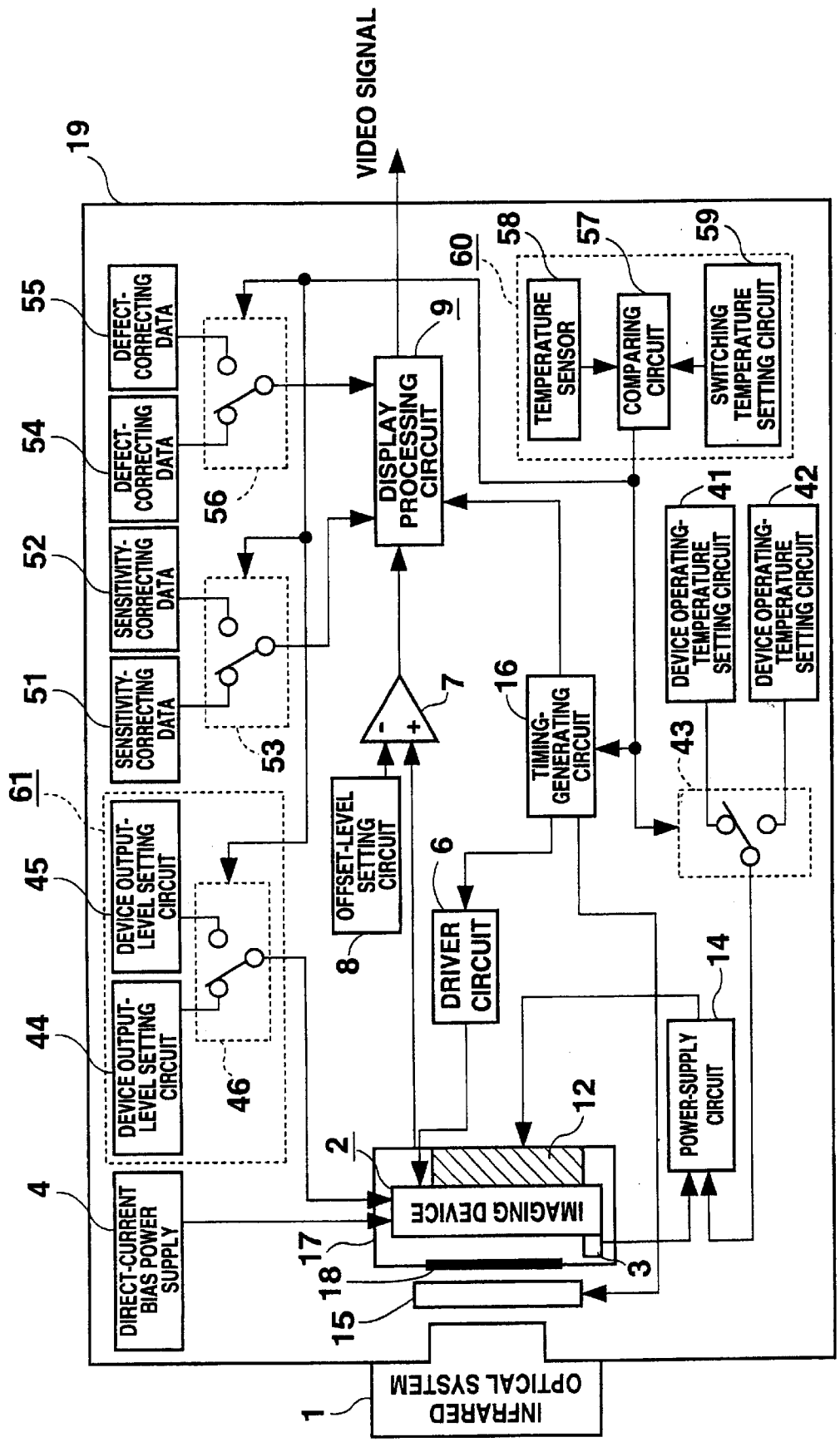
FIG. 5 is a block diagram showing the structure of Embodiment 5 of an infrared camera according to the present invention.
Figure 6:
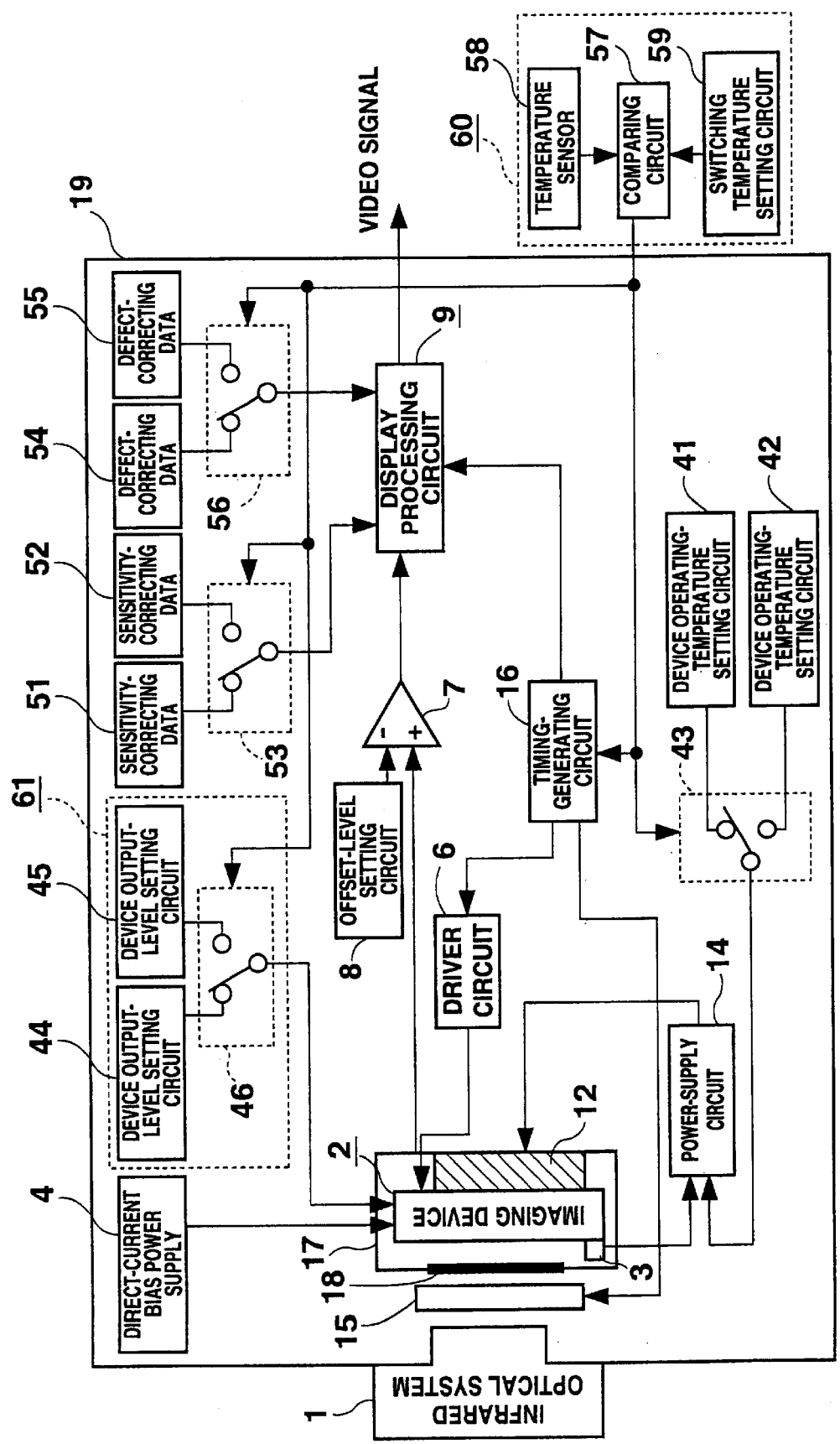
FIG. 6 is a block diagram showing the structure of Embodiment 6 of an infrared camera according to the present invention.
Figure 7:
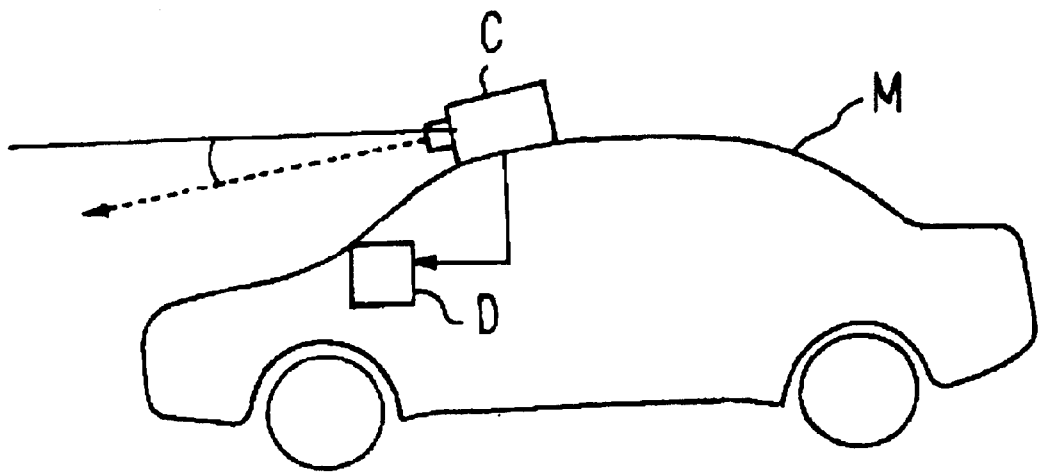
FIG. 7 is a view showing an infrared camera system in which an infrared camera is mounted on a moving object.
Figure 8:
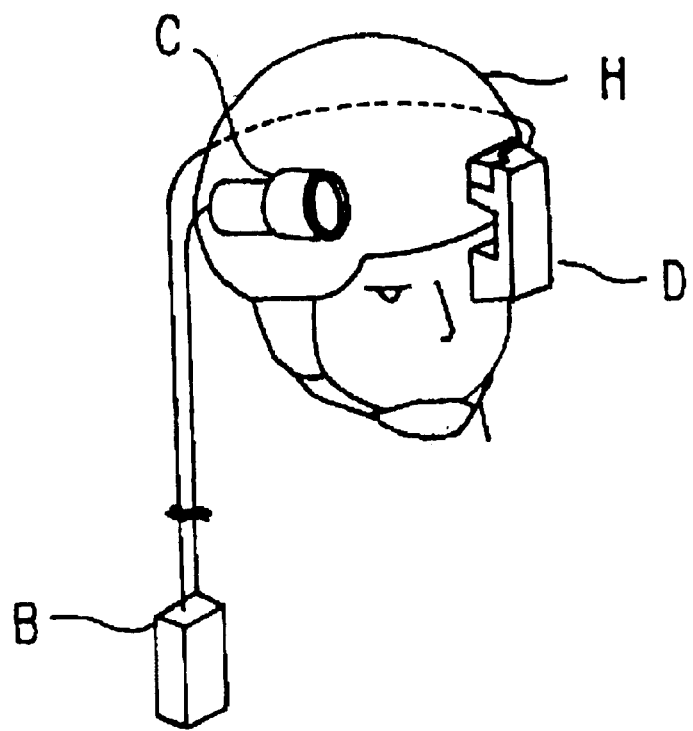
FIG. 8 is a view showing an infrared camera system in which a helmet equipped with an infrared camera is mounted on the head of a man.
Figure 9:
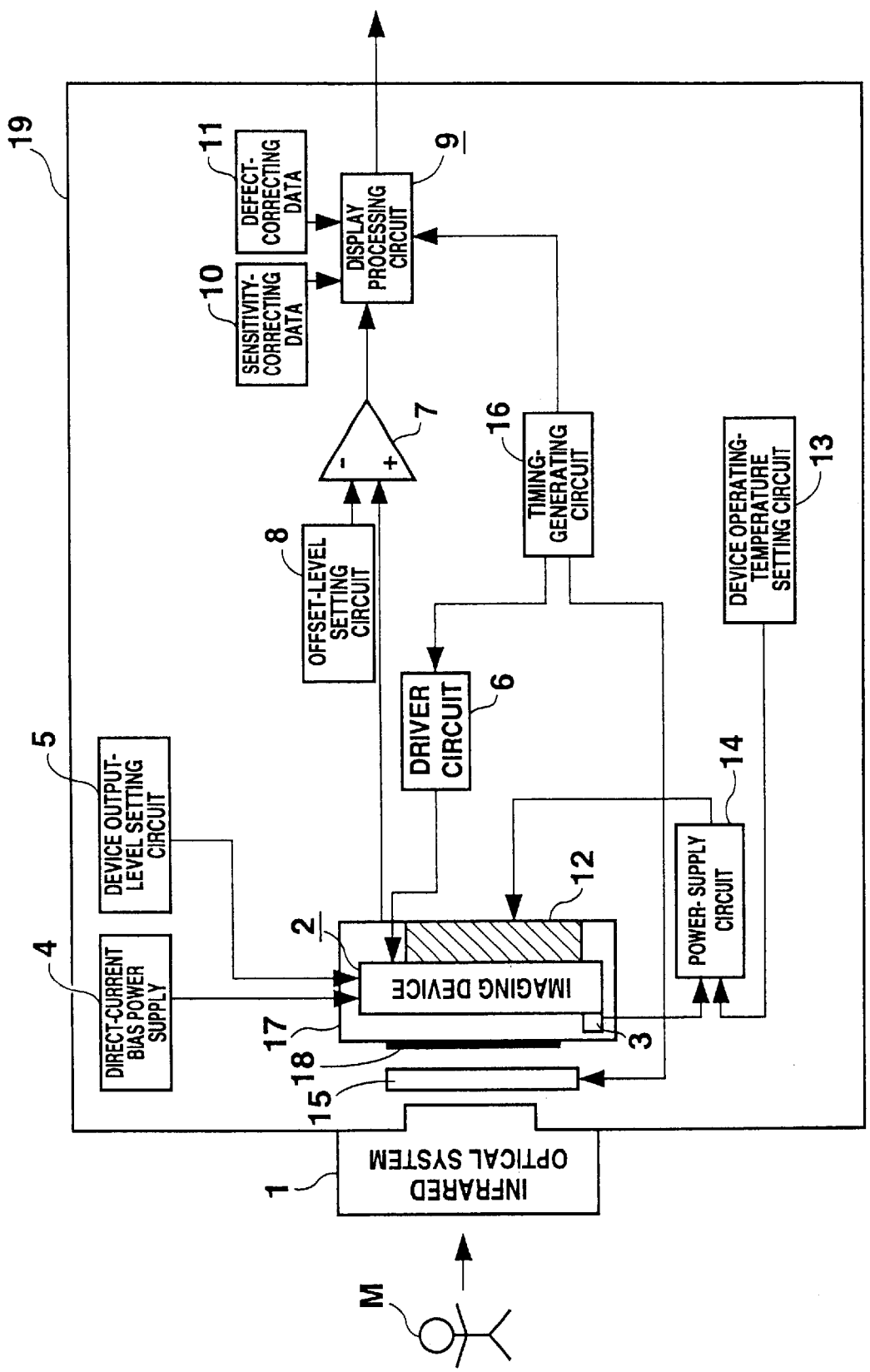
FIG. 9 is a block diagram showing the structure of a conventional infrared camera.
Figure 10:
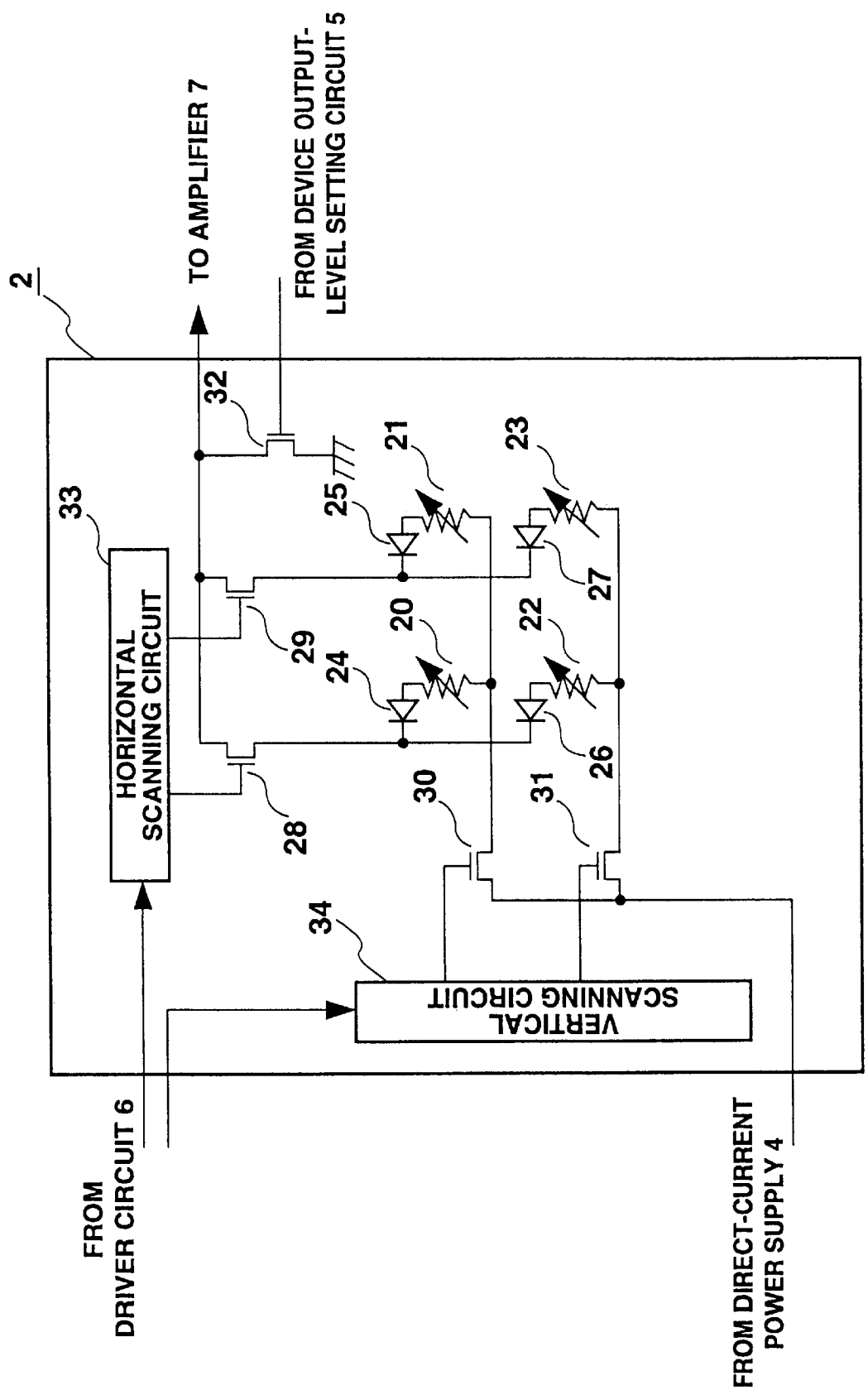
FIG. 10 is a view showing the structure of an imaging device in a conventional infrared camera.
Figure 11:
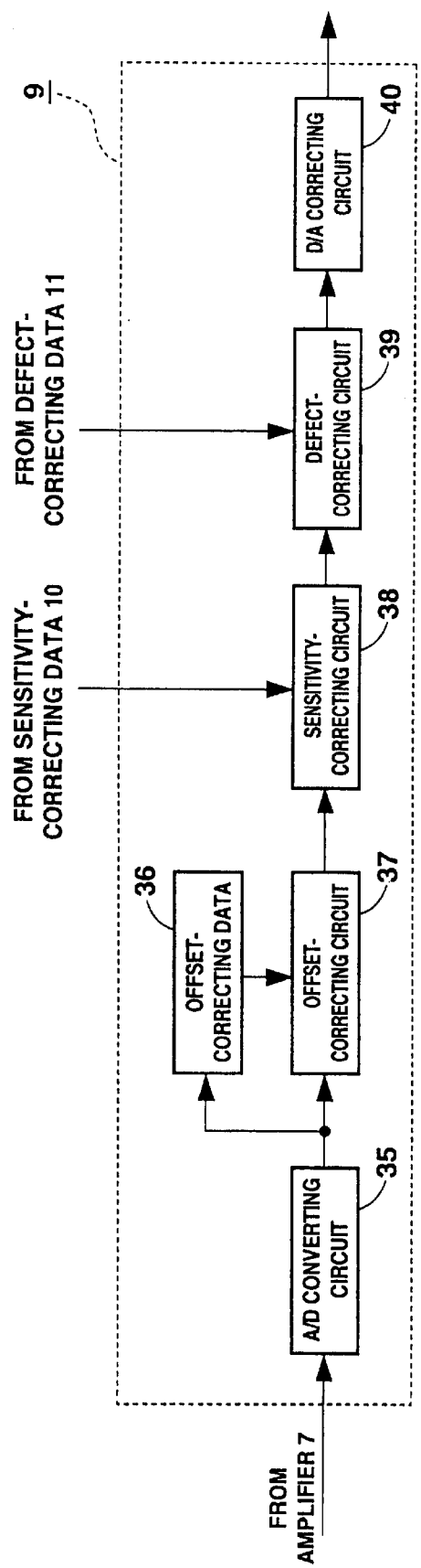
FIG. 11 is a view showing the structure of a display processing circuit 9 in a conventional infrared camera.

What is claimed is:

1. An infrared camera comprising:
   an infrared optical system;
   an imaging device located on the image-formed plane of the infrared optical system;
   a thermoelectric device thermally connected to the imaging device;

a device-temperature monitor thermally connected to the imaging device;

a device package for housing the imaging device, the thermoelectric device, and the device-temperature monitor;

a plurality of device operating-temperature setting means each having a different device operating-temperature setting;

device operating-temperature switching means for switching the output of the plurality of device operating-temperature setting means;

drive control means for drive-controlling the thermoelectric device based on the output switched by the device operating-temperature switching means and on the output of the device-temperature monitor;

drive means for driving the imaging device;

amplifying means for amplifying the output of the imaging device; and device output-level compensating means for carrying out adjustment so as to make the output level of the imaging device constant, wherein the device output-level compensating means includes:
- a plurality of direct-current bias power supplies each having a different bias voltage setting; and
- direct-current bias power supply switching means for selecting one of the outputs of the plurality of direct-current bias power supplies and supplying the imaging device with the selected output.

2. The infrared camera according to claim 1, further comprising an external switch for outputting signals to switch both the connection targets of the device operating-temperature switching means and the direct-current bias power supply switching means.

3. The infrared camera according to claim 1, further comprising device operating-temperature auto-switching means including:

a temperature sensor;

switching temperature setting means for setting a switching temperature; and comparing means for comparing a temperature measurement by the temperature sensor and a temperature set by the switching temperature setting means and outputting switching signals to direct-current bias power supply switching means based on the comparison result.

4. The infrared camera according to claim 3, wherein the temperature sensor is located inside an enclosure housing the device package at least.

5. The infrared camera according to claim 3, wherein the temperature sensor is located outside an enclosure housing the device package at least.

6. An infrared camera system comprising:

a moving object on which the infrared camera according to claim 1 is mounted; and display means for displaying images obtained by the infrared camera.

7. An infrared camera system comprising:

the infrared camera according to claim 1, display means for displaying images obtained by the infrared camera;

fixing means for removably fixing the infrared camera and the display means to a man; and a battery for supplying the infrared camera and the display means with power.

8. An infrared camera comprising:

an infrared optical system;

an imaging device located on the image-formed plane of the infrared optical system;

a thermoelectric device thermally connected to the imaging device;

a device-temperature monitor thermally connected to the imaging device;

a device package for housing the imaging device, the thermoelectric device, and the device-temperature monitor;

a plurality of device operating-temperature setting means each having a different device operating-temperature setting;

device operating-temperature switching means for switching the output of the plurality of device operating-temperature setting means;

drive control means for drive-controlling the thermoelectric device based on the output switched by the device operating-temperature switching means and on the output of the device-temperature monitor;

drive means for driving the imaging device;

amplifying means for amplifying the output of the imaging device; and device output-level compensating means for carrying out adjustment so as to make the output level of the imaging device constant, wherein the device output-level compensating means includes:
- a plurality of device output-level setting means each having a different device output-level setting; and
- device output-level switching means for selecting one of the outputs of the plurality of device output-level setting means and sending the selected output to the imaging device.

9. The infrared camera according to claim 8, further comprising an external switch for outputting signals to switch both the connection targets of the device operating-temperature switching means and the device output-level switching means.

10. The infrared camera according to claim 8, further comprising device operating-temperature auto-switching means including:

a temperature sensor;

switching temperature setting means for setting a switching temperature; and comparing means for comparing a temperature measurement by the temperature sensor and a temperature set by the switching temperature setting means and outputting switching signals to device output-level switching means based on the comparison result.

11. An infrared camera system comprising:

a moving object on which the infrared camera according to claim 8 is mounted; and display means for displaying images obtained by the infrared camera.

12. An infrared camera system comprising:

the infrared camera according to claim 8;

display means for displaying images obtained by the infrared camera;

fixing means for removably fixing the infrared camera and the display means to a man; and a battery for supplying the infrared camera and the display means with power.

13. An infrared camera comprising:

an infrared optical system;

an imaging device located on the image-formed plane of the infrared optical system;

a thermoelectric device thermally connected to the imaging device;

a device-temperature monitor thermally connected to the imaging device;

a device package for housing the imaging device, the thermoelectric device, and the device-temperature monitor;

a plurality of device operating-temperature setting means each having a different device operating-temperature setting;

device operating-temperature switching means for switching the output of the plurality of device operating-temperature setting means;

drive control means for drive-controlling the thermoelectric device based on the output switched by the device operating-temperature switching means and on the output of the device-temperature monitor;

drive means for driving the imaging device;

amplifying means for amplifying the output of the imaging device;

a plurality of offset-level setting means each having a different offset-level setting; and offset-level switching means for selecting one of the outputs of the plurality of offset-level setting means and sending the selected output to the amplifying means.

14. The infrared camera according to claim 13, further comprising an external switch for outputting signals to switch both the connection targets of the device operating-temperature switching means and the offset-level switching means.

15. The infrared camera according to claim 13, further comprising device operating-temperature auto-switching means including:

a temperature sensor;

switching temperature setting means for setting a switching temperature; and comparing means for comparing a temperature measurement by the temperature sensor and a temperature set by the switching temperature setting means and outputting switching signals to offset-level switching means based on the comparison result.

16. An infrared camera system comprising:

a moving object on which the infrared camera according to claim 13 is mounted; and display means for displaying images obtained by the infrared camera.

17. An infrared camera system comprising:

the infrared camera according to claim 13;

display means for displaying images obtained by the infrared camera;

fixing means for removably fixing the infrared camera and the display means to a man; and a battery for supplying the infrared camera and the display means with power.

18. An infrared camera comprising:

an infrared optical system;

an imaging device located on the image-formed plane of the infrared optical system;

a thermoelectric device thermally connected to the imaging device;

a device-temperature monitor thermally connected to the imaging device;

a device package for housing the imaging device, the thermoelectric device, and the device-temperature monitor;

a plurality of device operating-temperature setting means each having a different device operating-temperature setting;

device operating-temperature switching means for switching the output of the plurality of device operating-temperature setting means;

drive control means for drive-controlling the thermoelectric device based on the output switched by the device operating-temperature switching means and on the output of the device-temperature monitor;

drive means for driving the imaging device;

amplifying means for amplifying the output of the imaging device;

display processing means for processing the output of the amplifying means and outputting image signals;

a plurality of memories storing a plurality of sensitivity-correcting data corresponding to a plurality of operating temperatures set by the plurality of device operating-temperature setting means; and sensitivity-correcting data switching means for selecting one of the plurality of memories and outputting the contents of the selected memory to the display processing means.

19. The infrared camera according to claim 18, further comprising an external switch for outputting signals to switch both the connection targets of the device operating-temperature switching means and the sensitivity-correcting data switching means.

20. The infrared camera according to claim 18, further comprising device operating-temperature auto-switching means including:

a temperature sensor;

switching temperature setting means for setting a switching temperature; and comparing means for comparing a temperature measurement by the temperature sensor and a temperature set by the switching temperature setting means and outputting switching signals to sensitivity-correcting data switching means based on the comparison result.

21. An infrared camera system comprising:

a moving object on which the infrared camera according to claim 18 is mounted; and display means for displaying images obtained by the infrared camera.

22. An infrared camera system comprising:

the infrared camera according to claim 18;

display means for displaying images obtained by the infrared camera;

fixing means for removably fixing the infrared camera and the display means to a man; and a battery for supplying the infrared camera and the display means with power.

23. An infrared camera comprising:

an infrared optical system;

an imaging device located on the image-formed plane of the infrared optical system;

a thermoelectric device thermally connected to the imaging device;

a device-temperature monitor thermally connected to the imaging device;

a device package for housing the imaging device, the thermoelectric device, and the device-temperature monitor;

a plurality of device operating-temperature setting means each having a different device operating-temperature setting;

device operating-temperature switching means for switching the output of the plurality of device operating-temperature setting means;

drive control means for drive-controlling the thermoelectric device based on the output switched by the device operating-temperature switching means and on the output of the device-temperature monitor;

drive means for driving the imaging device;

amplifying means for amplifying the output of the imaging device;

a plurality of memories storing a plurality of defect-correcting data corresponding to a plurality of operating temperatures set by the plurality of device operating-temperature setting means; and defect-correcting data switching means for selecting one of the plurality of memories and outputting the contents of the selected memory to the display processing means.

24. The infrared camera according to claim 23, further comprising an external switch for outputting signals to switch both the connection targets of the device operating-temperature switching means and the defect-correcting data switching means.

25. The infrared camera according to claim 23, further comprising device operating-temperature auto-switching means including:

a temperature sensor;

switching temperature setting means for setting a switching temperature; and comparing means for comparing a temperature measurement by the temperature sensor and a temperature set by the switching temperature setting means and outputting switching signals to defect-correcting data switching means based on the comparison result.

26. An infrared camera system comprising:

a moving object on which the infrared camera according to claim 23 is mounted; and display means for displaying images obtained by the infrared camera.

27. An infrared camera system comprising:

the infrared camera according to claim 23;

display means for displaying images obtained by the infrared camera;

fixing means for removably fixing the infrared camera and the display means to a man; and a battery for supplying the infrared camera and the display means with power.

* * * * *